(12) United States Patent
Romano et al.

(10) Patent No.: US 11,265,996 B2
(45) Date of Patent: Mar. 1, 2022

(54) SOLID STATE LIGHTING FIXTURES

(71) Applicant: Hubbell Incorporated, Shelton, CT (US)

(72) Inventors: Perry Romano, Bradenton, FL (US); Adam Joseph Clark, Bradenton, FL (US)

(73) Assignee: HUBBELL INCORPORATED, Shelton, CT (US)

(*) Notice: Subject to any disclaimer, the term of this patent is extended or adjusted under 35 U.S.C. 154(b) by 388 days.

(21) Appl. No.: 15/144,037

(22) Filed: May 2, 2016

(65) Prior Publication Data

US 2016/0320044 A1  Nov. 3, 2016

Related U.S. Application Data

(60) Provisional application No. 62/156,251, filed on May 2, 2015, provisional application No. 62/155,264, filed (Continued)

(51) Int. Cl.
| | |
|---|---|
| *F21V 29/50* | (2015.01) |
| *H05B 47/19* | (2020.01) |
| *F21V 23/00* | (2015.01) |
| *H05B 45/10* | (2020.01) |
| *H05B 45/24* | (2020.01) |
| *H05B 47/16* | (2020.01) |
| *F21V 15/01* | (2006.01) |
| *F21V 23/04* | (2006.01) |

(Continued)

(52) U.S. Cl.
CPC ............. *H05B 47/19* (2020.01); *F21S 8/046* (2013.01); *F21V 15/01* (2013.01); *F21V 21/116* (2013.01); *F21V 21/30* (2013.01);

*F21V 23/007* (2013.01); *F21V 23/008* (2013.01); *F21V 23/04* (2013.01); *F21V 23/0435* (2013.01); *F21V 29/77* (2015.01); *H02J 9/06* (2013.01); *H05B 45/10* (2020.01); *H05B 45/24* (2020.01); *H05B 47/16* (2020.01); *F21Y 2115/10* (2016.08); *H05B 45/30* (2020.01)

(58) Field of Classification Search
CPC ........... F21S 8/02; F21S 8/026; F21V 23/008; F21V 29/50; F21V 29/77; H05B 33/0866
See application file for complete search history.

(56) References Cited

U.S. PATENT DOCUMENTS

| | | | |
|---|---|---|---|
| 4,894,758 A | 1/1990 | O'Toole | |
| 8,360,614 B1* | 1/2013 | Soderman | F21V 29/004 362/249.02 |

(Continued)

OTHER PUBLICATIONS

PCT International Search Report and Written Opinion dated Aug. 8, 2016 from corresponding Application No. PCT/US2016/030390, 15 pages.

*Primary Examiner* — Karabi Guharay
(74) *Attorney, Agent, or Firm* — Dilworth IP, LLC

(57) ABSTRACT

The present disclosure provides a solid state lighting fixture that can be used in outdoor and indoor recessed lighting applications. The solid state lighting fixture has a recessed housing configured to be installed in a recess, and a solid state light assembly capable of being secured to the housing outside the recess. The solid state light assembly is at least partially made of a heat dissipating material capable transferring heat generated by the solid state light assembly to ambient air.

18 Claims, 12 Drawing Sheets

Related U.S. Application Data on Apr. 30, 2015, provisional application No. 62/155,293, filed on Apr. 30, 2015, provisional application No. 62/155,166, filed on Apr. 30, 2015.

(51) Int. Cl.
| | | |
|---|---|---|
| *F21V 29/77* | (2015.01) | |
| *F21V 21/116* | (2006.01) | |
| *F21V 21/30* | (2006.01) | |
| *F21S 8/04* | (2006.01) | |
| *H02J 9/06* | (2006.01) | |
| *F21Y 115/10* | (2016.01) | |
| *H05B 45/30* | (2020.01) | |

(56) References Cited

U.S. PATENT DOCUMENTS

| | | | |
|---|---|---|---|
| 9,192,027 B1* | 11/2015 | Pistilli | H05B 37/0227 |
| 2007/0132398 A1 | 6/2007 | Ferguson et al. | |
| 2008/0273331 A1* | 11/2008 | Moss | F21V 17/168 |
| | | | 362/294 |
| 2010/0148652 A1 | 6/2010 | Vetrovec | |
| 2011/0050133 A1 | 3/2011 | Grajcar et al. | |
| 2012/0243235 A1 | 9/2012 | Dao et al. | |
| 2012/0287616 A1 | 11/2012 | Wilcox et al. | |
| 2013/0329405 A1* | 12/2013 | Chow | F21S 8/02 |
| | | | 362/147 |
| 2014/0063817 A1* | 3/2014 | Bartenbach | F21V 7/0091 |
| | | | 362/311.02 |
| 2016/0281939 A1* | 9/2016 | Luk | F21S 8/026 |

\* cited by examiner

| ITEM | PART NUMBER | PART DESCRIPTION |
|---|---|---|
| 526 | CEH-55-0098 | HARNESS, AC ADAPTER TO 2 DRIVERS, CEILEO |
| 525 | CHG-CEILEO-01 | PLUG, CEILEO |
| 524 | CEH-8-017 | TUBING, SPLIT WIRE LOOM, 1/4" |
| 523 | CEH-55-0069 | HARNESS, ENGINE, MALE, 15" W/TC |
| 522 | CEH-55-0094 | HARNESS, OUTPUT, SERIES, 2 DRIVERS |
| 521 | CEH-60-0027 | STRAIN RELIEF, SNAP IN, RATCHETING, 7/8" |
| 520 | CHR-72-0805 | RIVET BLIND 1/8 X 1/16-1/8 GRIP AL |
| 519 | CEW-0-1705 | WIRE TIE, 50LBS NYLON, EYELET |
| 518 | CHS-74-8000-010 | SP-SCREW, #10-24 X 1/2" HEX HEAD TYPE F, SS (SELF-TAPPING) |
| 517 | 93057136 | SUGE PROTECTOR 120-277 VOLTS, 20K AMPS |
| 516 | CHS-74-0450-03 | SP-SCREW NO 4-40 X 1/2" PAN HD PHIL, SS |
| 515 | CHS-74-8000-011 | SP-SCREW, #6-32 X 3/8" PHIL PAN HD, TYPE F, SS (SELF-TAPPING) |
| 514 | CHS-74-8000-009 | SP-SCREW, #8-32 X 1/2" HEX HEAD, TYPE F, SS (SELF-TAPPING) |
| 513 | CHS-71-03-0010 | NUT, 1/4-20 CLIP-ON, STEEL, ZINC PLATED |
| 512 | CHS-74-5040-004 | SCREW, 1/4-20X4" PHIL PAN HD, SS |
| 511 | 93056501 | LED DRIVER, 40W, CC 700mA, LED 40W-054-C0700-D3 |
| 510 | CLD-CEI-001 | CVR-CMPT WIRE CEILEO |
| 509 | CLC-CEI-005 | PLT-MTG DRIVER CEILEO |
| 508 | CLC-CEI-007 | ENCL-END DRIVER CEILEO |
| 507 | CLC-CEI-004 | PLT-MTG DRIVER CLIP DIVIDER CEILEO |
| 506 | CLC-CEI-003 | ENCL-PLT END CEILEO |
| 505 | CLM-CEI-001 | ENCL-BASE CEILEO |
| 504 | CLM-CEI-006 | ENCL-BODY CEILEO |
| 503 | CLC-CEI-001 | HOUSING, CEILEO SQUARE BODY |
| 502 | CLC-CEI-002 | HOUSING, CEILEO ROUND BODY |
| 501 | ASM-LED-MODULE-11 | ASM LED MODULE, 6" PCB, 219, TC |

*FIG. 6*

| ITEM | PART NUMBER | PART DESCRIPTION |
|---|---|---|
| 1301 | CEH-74-0425-01 | SCREW, #4-40 X 1/4" BUTTON HD SOC, SS |
| 1302 | CHW-73-0004-002 | WASHER, #4 FLAT, SS, 0.375" OD |
| 1303 | CHG-0-0051 | SCREW SEAL, FABRICATED BEZEL, GENESIS |
| 1304 | CHG-0-0065 | GASKET, ENGINE, 6" PCB, YOKE MNT |
| 1305 | CHG-0-0066 | GASKET, BEZEL, 6" PCB, YOKE MNT |
| 1306 | LED-E60-24-5K-231 | 24 LED ENGINE, 6" BOARD, (4X6) 219B CHIPS, 5000K, DIMMING |
|  | LED-E60-24-4K-231 | 24 LED ENGINE, 6" BOARD, (4X6) 219B CHIPS, 4000K, DIMMING |
|  | LED-E60-24-3K-231 | 24 LED ENGINE, 6" BOARD, (4X6) 219B CHIPS, 3000K, DIMMING |
|  | LED-E60-24-590-001 | 24 LED ENGINE, 6" BOARD, (4X6) 590NM |
| 1307 | 93040623 | LED LENS, FOR 219 CHIP, TYPE 2X2 |
|  | 93040614 | LED LENS, FOR 219 CHIP, TYPE 4X4 |
|  | 93040078 | LED LENS, FOR 219 CHIP, TYPE v F50 (5X5) |
|  | 93039184 | LED LENS, FOR 219 CHIP, TYPE 6X6 |
|  | 93040634 | LED LENS, FOR 219 CHIP, TYPE 3X5 |
|  | 93038769 | LED LENS, FOR 219 CHIP, TYPE II |
|  | 93037678 | LED LENS, FOR 219 CHIP, TYPE III |
|  | 93039104 | LED LENS, FOR 219 CHIP, TYPE IV |
|  | 93044292 | LED LENS, FOR 219 CHIP, TYPE V WIDE |
|  | 93042724 | LED LENS, FOR 219 CHIP, TYPE V SQ NARROW |
|  | 93042865 | LED LENS, FOR XPG/219 CHIP, TYPE V SQ MEDIUM |
|  | 93038768 | LED LENS, FOR 219 CHIP, TYPE V SQ WIDE |
|  | 93037857 | LED LENS, FOR 219 CHIP, TYPE V RECT. |
|  | 93038459 | LED LENS, FOR 219 CHIP, AISLE |
| 1308 | CLBZ-0005-24-02 | BEZEL, 6" BOARD, 24 LED, YOKE MNT |
| 1309 | CHS-74-1008-021 | SCREW, #10-32 X 1/8", PAN HD PHIL, BLACK NYLON |

*FIG. 14*

SOLID STATE LIGHTING FIXTURES

CROSS-REFERENCE TO RELATED APPLICATIONS

This application claims priority to co-pending U.S. Provisional Application No. 62/155,264, filed on Apr. 30, 2015, titled "Flexible Housing Assembly for SSL Light Fixtures," co-pending U.S. Provisional Application No. 62/155,166, filed on Apr. 30, 2015, titled "Solid State Light Fixtures with Integrated Controls," co-pending U.S. Provisional Application No. 62/155,293, filed on Apr. 30, 2015, titled "Control Device for Solid State Light Fixtures," and co-pending U.S. Provisional Application No. 62/156,251, filed on May 2, 2015, titled "Solid State Lighting Fixtures," all of which are hereby incorporated herein by reference in their entireties.

BACKGROUND

1. Field

The present disclosure relates generally to the field of lighting fixtures, and more particularly, the present disclosure relates to recessed solid state lighting fixtures.

2. Description of the Related Art

Recent advances in solid-state lighting technologies, particularly in light emitting diode (LED) lighting technologies, offer significantly longer operational lifetimes and increase lighting efficiencies which enable significant energy and cost savings. These benefits provide motivation to use solid-state lighting technologies in a number of different applications, including recessed lighting applications. A difficulty with recessed solid state lighting fixtures is the dissipation of heat generated by the solid state lighting elements.

SUMMARY

The present disclosure provides a solid state lighting (SSL) fixture that can be used in outdoor and indoor recessed lighting applications. In an exemplary embodiment, the SSL fixture includes a recessed housing configured to be installed in a recess, and an SSL assembly capable of being secured to the housing outside the recess. The SSL assembly is made of a heat dissipating material capable transferring heat generated by the SSL assembly to ambient air.

The present disclosure also provides SSL assemblies that have an SSL light engine and a housing capable of dissipating heat generated by the SSL light engine. In an exemplary embodiment, the SSL assembly includes an external housing and an SSL light engine secured within a recess within the external housing. The SSL light engine includes one or more SSL light elements mounted to a light engine board. The external housing is made of a heat dissipating material capable transferring heat generated by the SSL light engine to ambient air.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 6 is a parts list for the recessed SSL fixture of FIG. 5;

FIG. 14 is a parts list for the SSL light engine of FIG. 13;

DETAILED DESCRIPTION

Figure 1:
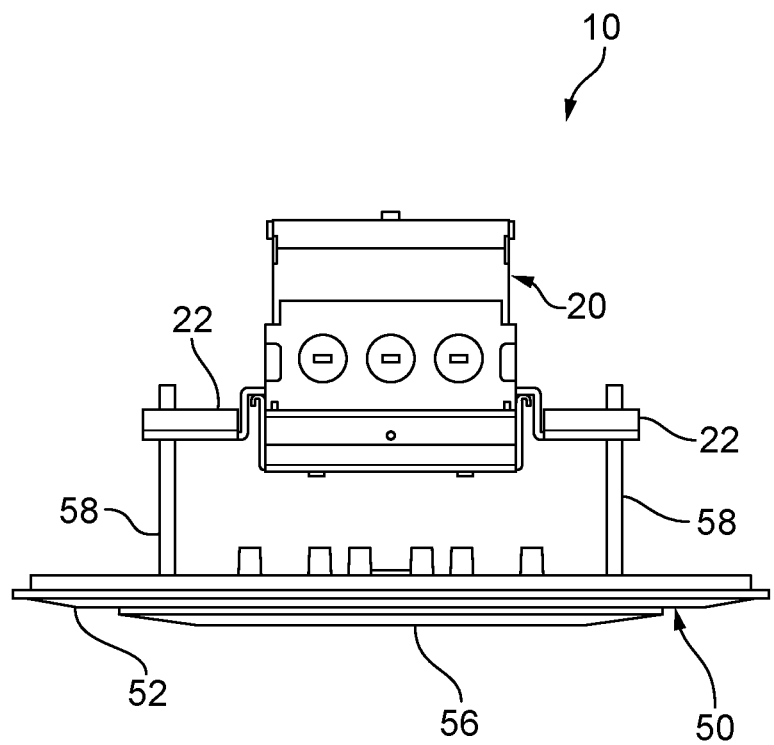
FIG. 1 is a side view of a recessed SSL fixture according to some embodiments of the present disclosure.
Figure 2:
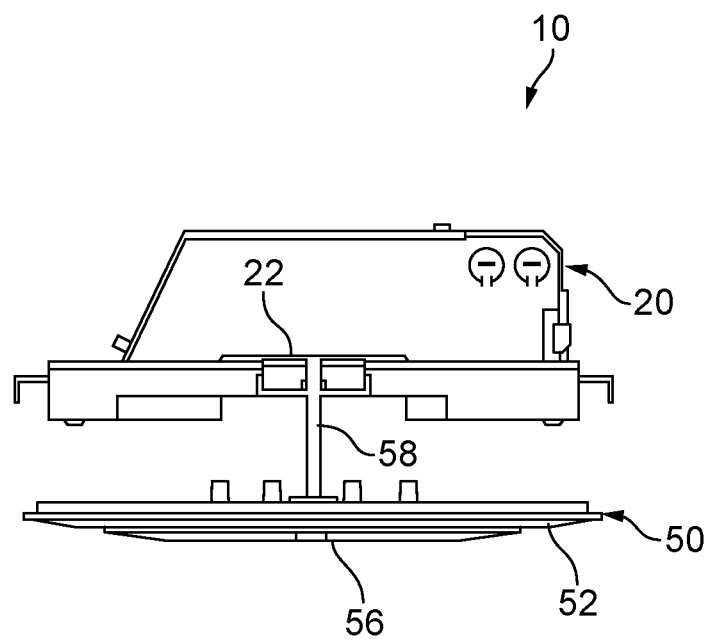
FIG. 2 is another side view of a recessed SSL fixture of FIG. 1.
Figure 3:
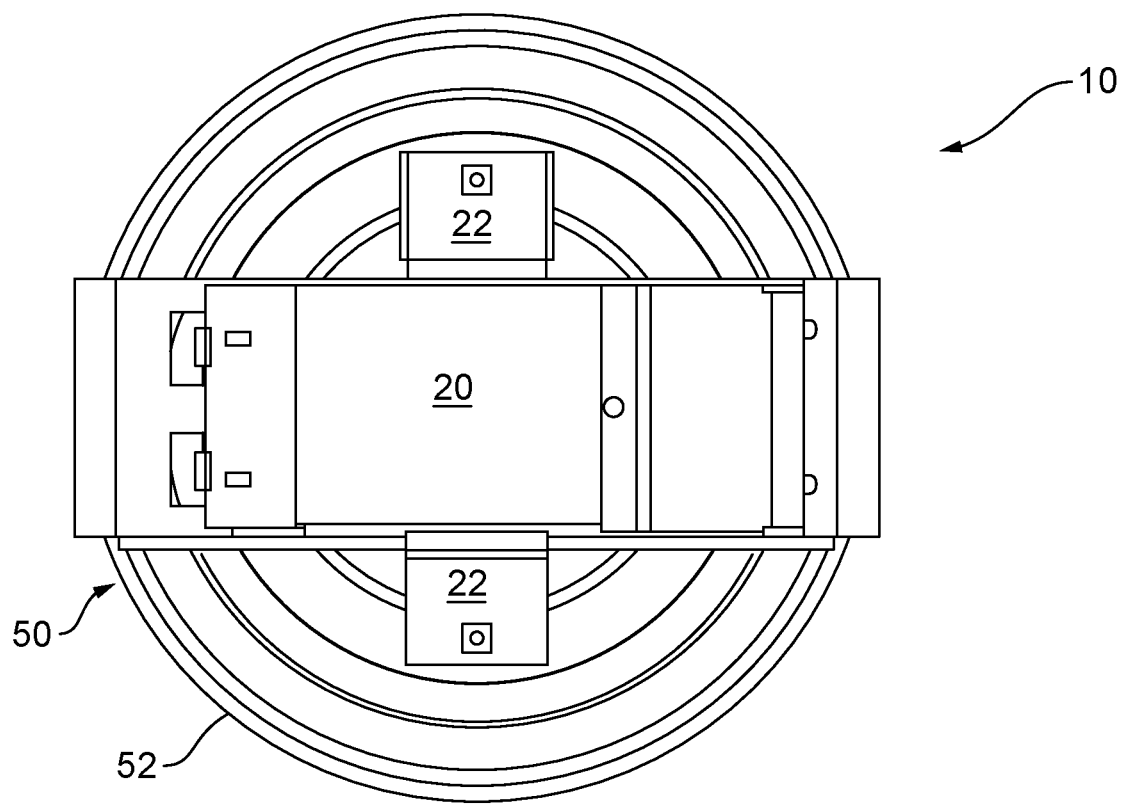
FIG. 3 is a top plan view of the recessed SSL fixture of FIG. 1.
Figure 4:
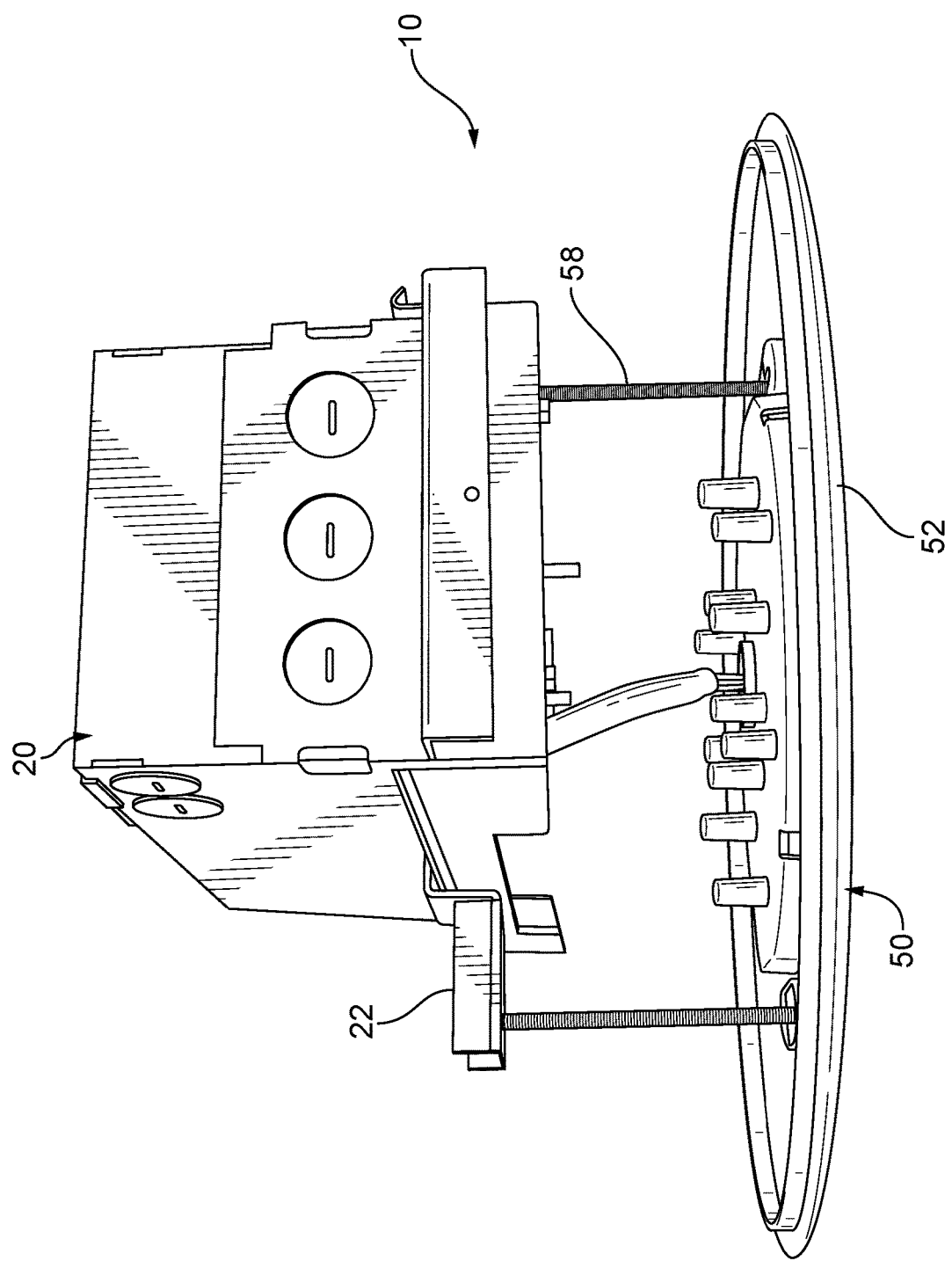
FIG. 4 is an image of a recessed SSL fixture from the side illustrating a space between a recessed housing and an SSL assembly.

The following description and drawings are illustrative and are not to be construed as limiting. Numerous specific details are described to provide a thorough understanding of the disclosure. However, in certain instances, well known or conventional details are not described in order to avoid obscuring the description.

Reference in this specification to "one embodiment," "an embodiment" or the like means that a particular feature, structure, characteristic, advantage or benefit described in connection with the embodiment may be included in at least one embodiment of the disclosure, but may not be exhibited by other embodiments. The appearances of the phrase "in one embodiment" in various places in the specification are not necessarily all referring to the same embodiment, nor are separate or alternative embodiments mutually exclusive of other embodiments. Similarly, various requirements are described which may be requirements for some embodiments but not for other embodiments. The specification and drawings are to be regarded in an illustrative sense rather than a restrictive sense. Various modifications may be made thereto without departing from the spirit and scope as set forth in the claims.

The present disclosure provides a solid state lighting fixture (SSL fixture) that can be used in outdoor and indoor recessed lighting applications. The SSL fixture utilizes high powered solid state elements (SSL elements), e.g., LEDs, for precise efficient optical control. The SSL fixture can be used, for example, to replace up to 175W and 250 Watt HID lamps with 55 watts, and at the same time reduce maintenance by delivery of over 200,000 hours of projected life for the SSL elements. The present disclosure also provides SSL assemblies that have an SSL light engine and a housing capable of dissipating heat generated by the SSL light engine.

Referring to FIGS. 1-6, an exemplary embodiment of an SSL fixture according to the present disclosure is provided. In this embodiment, the SSL fixture 10 includes a recessed driver housing 20 and an SSL assembly 50. The recessed driver housing 20 is configured to be mounted within a recess in, for example, a ceiling or other similar structure, and supports electrical wiring connections and one or more solid state lighting driver (SSL driver). In the embodiment shown, the interior of the driver housing 20 is partitioned into a driver compartment and a junction box. The junction box is partitioned into two compartments, one for AC wiring and the other for low voltage (e.g., dimming) wiring with a releasably secured cover, e.g., a cover that is screwed onto or snapped onto the housing, for easy access to the compartments. The housing 20 also includes a pair of mounting arms 22 configured to permit securing the SSL assembly 50 to the recessed housing 20. An external housing 52 is secured to the recessed housing 20 using, for example, screws 58 secured to mounting arms 22 on recessed housing 20. Note that the term "screw," as used herein, may designate any threaded component, including screws and bolts.

Figure 5:
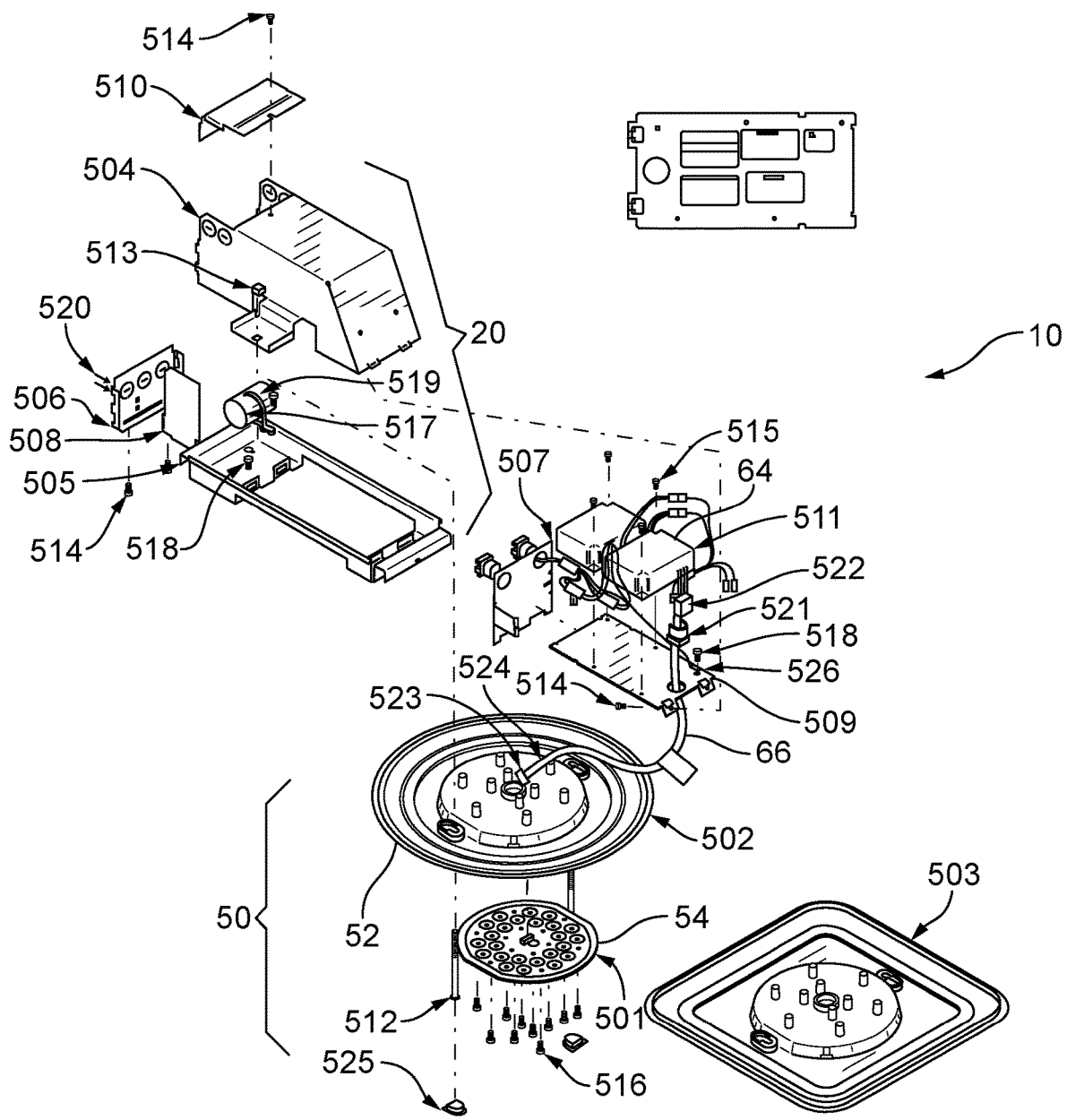
FIG. 5 is an exploded perspective view of the SSL fixture of FIG. 1, with parts of the SSL fixture shown separated.
Figure 13:
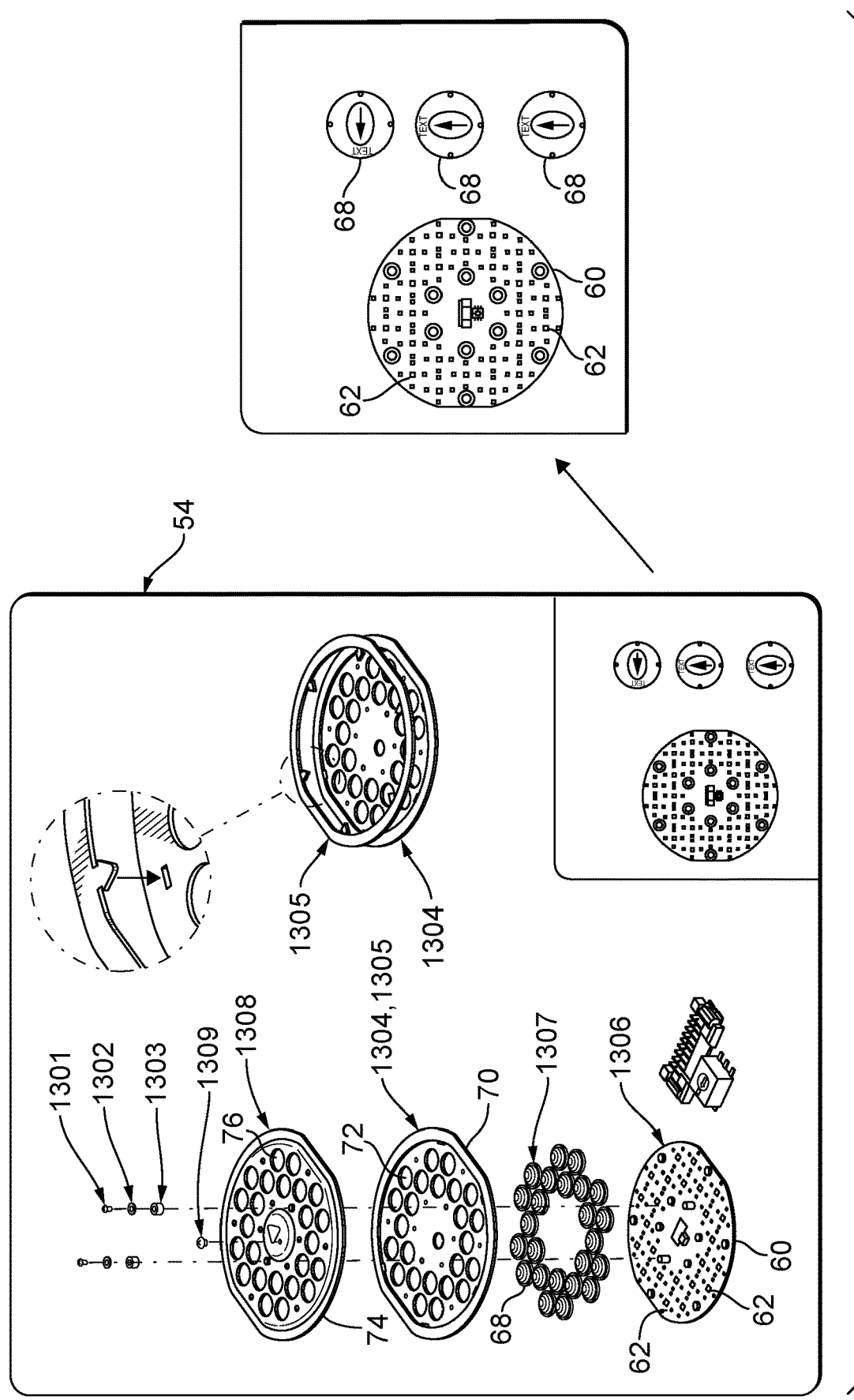
FIG. 13 illustrates exemplary components of an SSL light engine of an SSL assembly according to the present disclosure.
Figure 15:
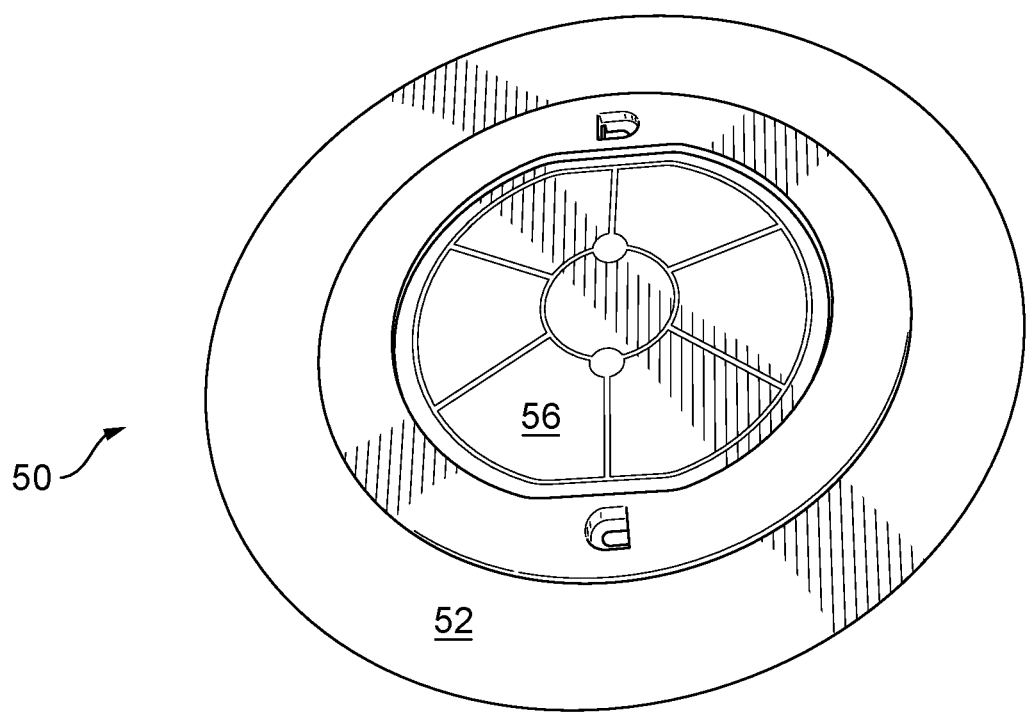
FIG. 15 is an image of an outer surface of a round external housing of an SSL assembly according to the present disclosure, and illustrating a diffusing lens positioned over an SSL light engine.
Figure 16:
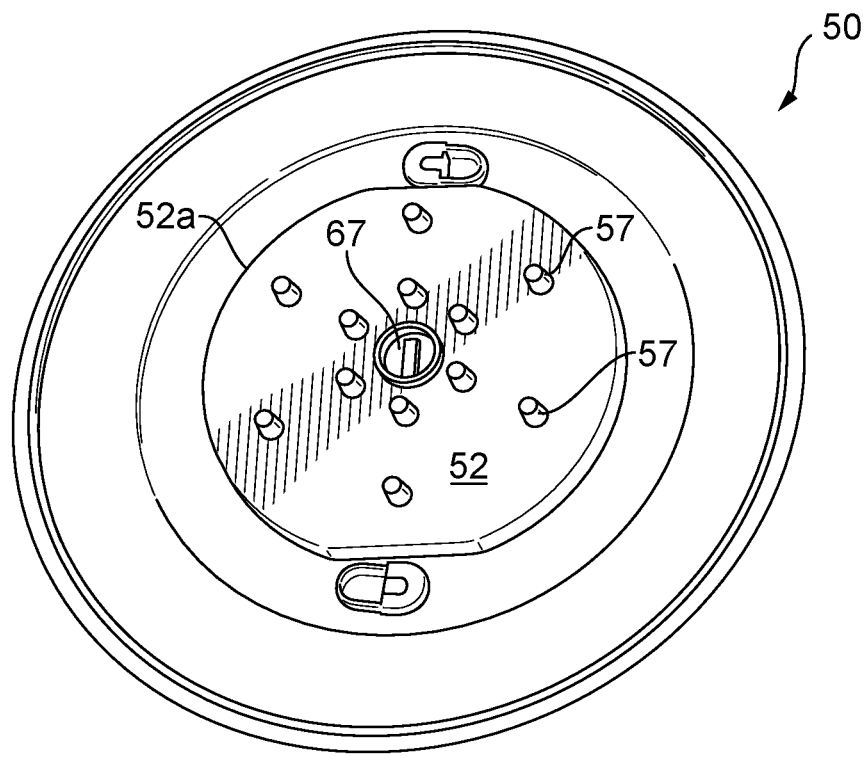
FIG. 16 is an image of an inner surface of the round external housing of FIG. 15.
Figure 17:
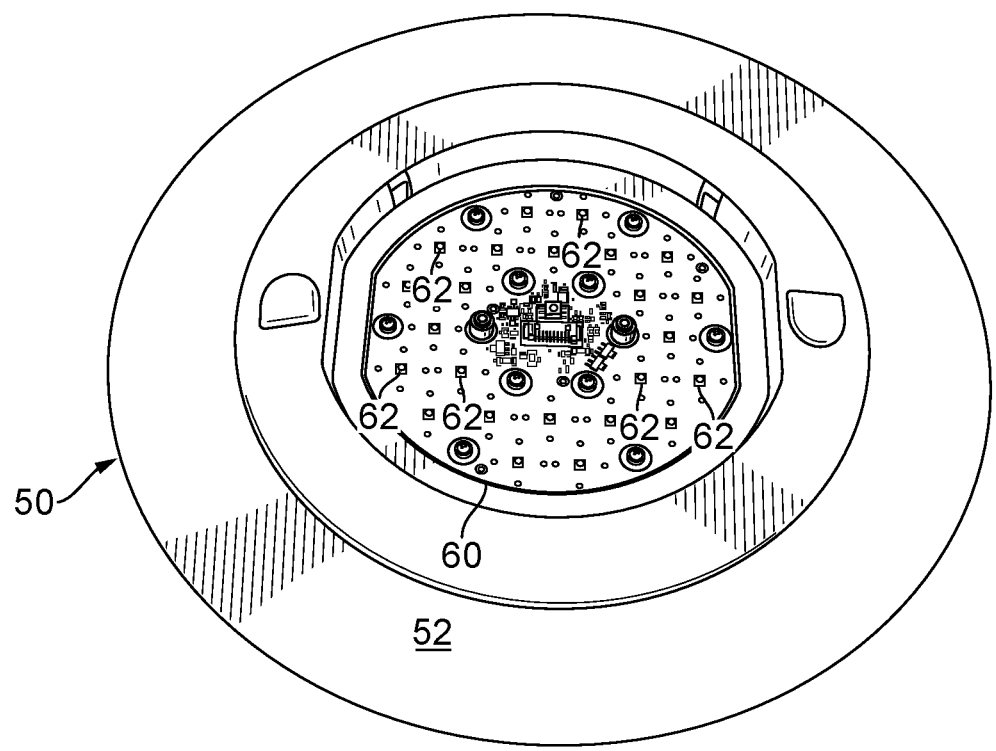
FIG. 17 is an image of an outer surface of the round external housing of an SSL assembly of FIG. 15, illustrating the diffusing lens removed from the SSL light engine to reveal SSL elements mounted to a light engine board.
Figure 18:
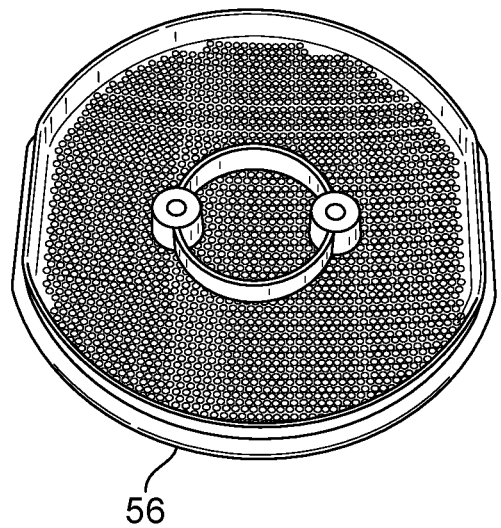
FIG. 18 is an image of the diffusing lens of FIG. 15.

Referring to FIG. 5, there is shown an exploded perspective view of the SSL fixture 10 of FIG. 1, with parts of the SSL fixture shown separated. The SSL fixture 10 includes a recessed driver housing 20 and an SSL assembly 50. The following components are shown:

Bezel assembly 501—also shown in FIG. 13;
Heat sink 502—supports & provides heat sinking to LED engine;
Alternative heat sink 503—supports & provides heat sinking to LED engine;
Recessed housing, upper component 504—encloses electrical components & wiring;
Recessed housing, lower component 505—Completes enclosure of wiring compartments, and facilitates mounting of fixture to building components (typically conduit passing under the flanges at the front and back ends);
Back cover 506—completes enclosure of wiring compartments & provides conduit fitting knockouts;
Partition 507—completes enclosure of wiring compartments & aids in support of driver tray 509;
Partition 508—separates high voltage and low voltage wiring compartments;
Driver tray 509—supports and encloses drivers 511 and other electrical components;
Cover 510—encloses & provides access to wiring compartments;
Driver 511—converts input power, typically AC, to constant current DC suitable for powering the LEDs;
Screw 512—secures heat sink #502 or #503 to recessed housing section #505, with ceiling panel interposing (e.g., heat sink is pulled against building ceiling panel);
Cage nut 513—inserted into recessed housing section #504 for engagement of screw #512 (e.g., to secure heat sink against ceiling);
Screw 514—secures back cover #506;
Screw 515—secures driver;
Screw 516—secures bezel assembly 501 to heat sink;
Surge protection device 517—clamps electrical line surges above a threshold voltage to protect drivers and other downstream equipment;
Ground screw 518;
Cable tie 519—for securing surge suppressor;
Back cover component 520;
Strain relief 521—for protection of output wires;
Output wiring harness (partial) 522;
Connector 523—engages the LED engine for power and dimming control interface;
Output wiring harness 524;
Rubber plug 525—for aesthetic concealment of screws 512;
Grounding lead 526.

Figure 7:
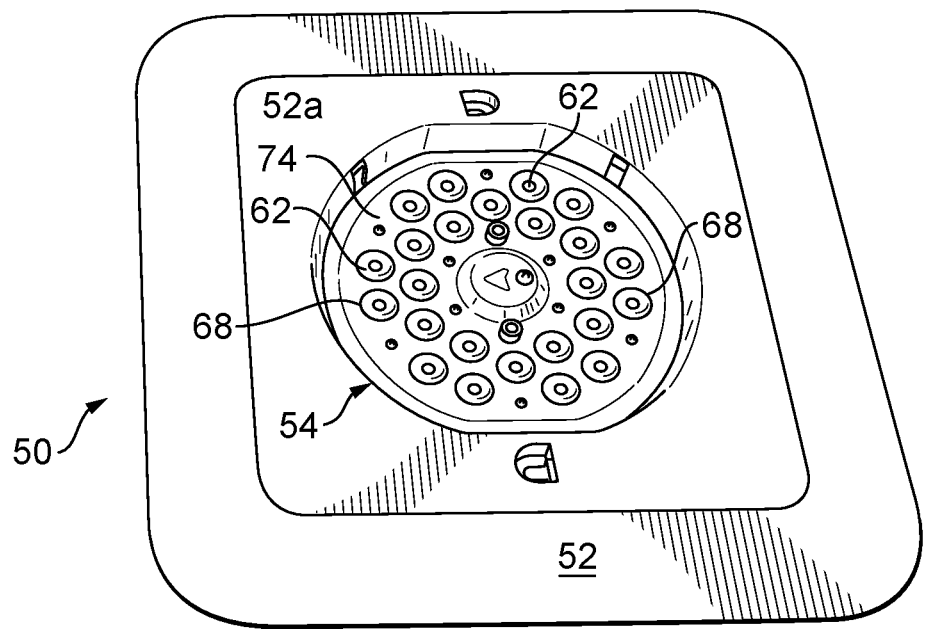
FIG. 7 is an image of a square external housing of an SSL assembly according to the present disclosure, and illustrating an SSL light engine.
Figure 8:
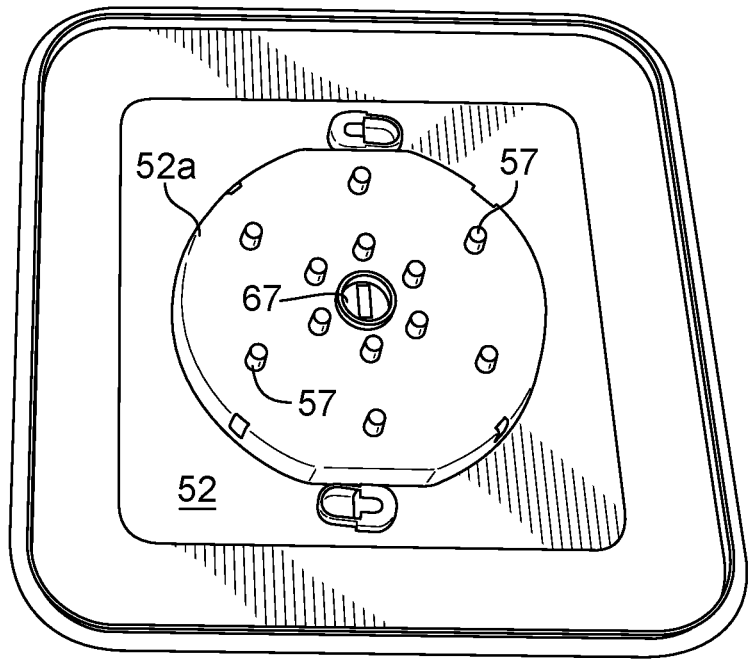
FIG. 8 is an image of an inner surface of the square external housing of FIG. 7.
Figure 9:
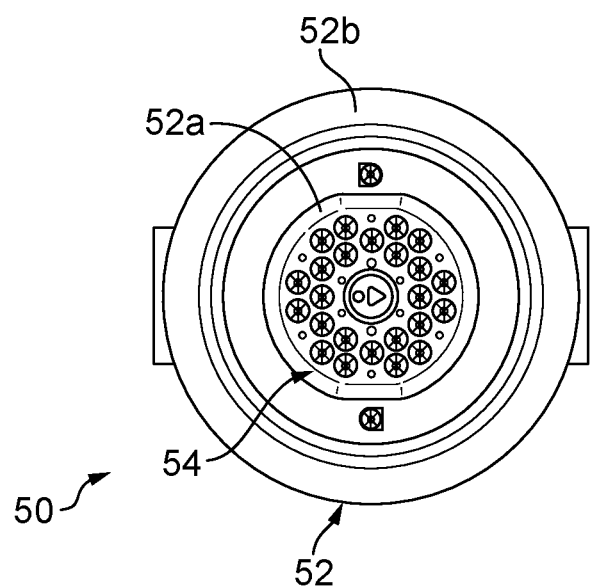
FIG. 9 is a top plan view of a round SSL assembly according to the present disclosure.
Figure 10:
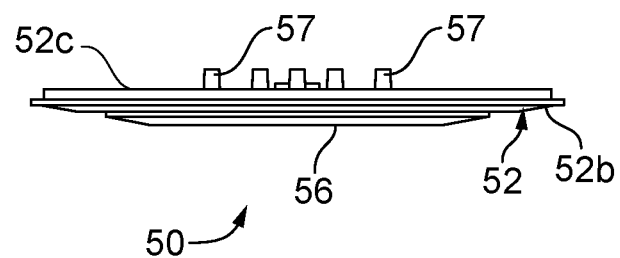
FIG. 10 is a side view of the round SSL assembly of FIG. 9.
Figure 11:
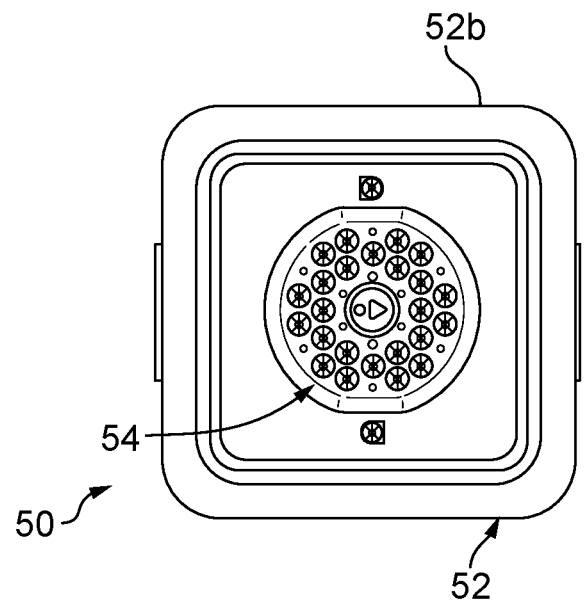
FIG. 11 is a top plan view of a square SSL assembly according to the present disclosure.
Figure 12:
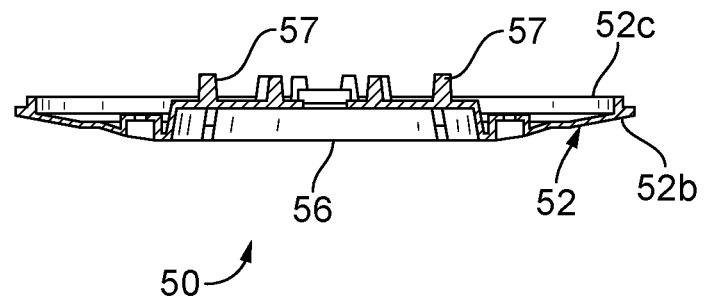
FIG. 12 is a side section view of the square SSL assembly of FIG. 11.

Referring to FIGS. 7-18, the SSL assembly 50 includes the external housing 52, and an SSL light engine 54. The SSL assembly can co-exist with 0-10V current-sinking control devices, e.g., occupancy sensors, external dimmers, etc. The external housing 52 may come in any shape, but is shown in FIGS. 7-18 as round and square in shape. The external housing 52 is preferably made of a material capable of dissipating heat generated by the SSL light engine 54, such as cast aluminum, which will be described in more detail below. The SSL light engine 54 is secured within a recess in the external housing 52, as seen in FIG. 7.

The SSL light engine 54 may be any solid state light engine, such as an LED light engine. The LED light engine may be, for example, a 24-LED light engine that can be field adjusted to four wattages (55, 45, 30, 15 watts) and four lumen outputs. The LED light engine can come with 70 CRI in 5000 k temperature. With a 0-10 V voltage supply provided from the one or more SSL drivers, the LED light engine includes a 0-10 V dimming capability, with some flicker-free dimming. The luminaire efficiency rating (LER) of the LED light engine 54 is preferably a minimum of 95, and the luminaire BUG rating preferably does not exceed B3-U1-G1. Generally, the SSL light engine 54 is preferably an optical one piece cartridge system. In one embodiment, seen in FIGS. 7-14, the SSL light engine 54 may include a light engine board 60 having one or more SSL light elements 62, one or more lenses 68, gasket 70, and bezel board 74. In this exemplary embodiment, the light engine board 60 has one or more SSL light elements 62, e.g., LED lamps, which can be mounted to the light engine board 60 in different patterns. The light engine board 60 is connected to one or more SSL drivers 64, e.g., LED drivers, positioned within the recessed housing 20, via cable 66 connected to connector 67 on light engine board 60. It is noted that the LED driver can accept 100V through 277V, 50 Hz to 60 Hz (UNIV), and the power factor is preferably a min 0.90 at full load. The plurality of lenses 68 are positioned over the SSL light elements 62, where one lens 68 is positioned over one SSL light element 62. Lenses 68 includes total internal reflection (TIR) optics. The gasket 70 has a plurality of apertures 72 configured to align with the lenses 68, and is positioned over the light engine board 60. The bezel board 74 has apertures 76 configured to align with apertures 72 in gasket 70. To secure the components of this embodiment of the SSL light engine 54 together, the bezel board is positioned over the gasket 70 and secured to the light engine board 60 as shown in FIG. 13. Each lens 68 has a plurality of integrated alignment pins projecting from its bottom surface. Each alignment pin engages a hole or aperture in the light engine board 60 in order to fix the optic location relative to the LED. This alignment defines the directionality of the optical distribution on the surface being illuminated. In some embodiments, the alignment pins are positioned in a regular spacing which allows the lens to be rotated in discrete increments, for example in 90 degree increments. This rotation of the lens can be useful for producing custom distributions or optical orientations at the customer's request. In general, each lens type is to be positioned in a specific orientation, with text, symbols, or other identifying features molded or integrated into the lens 68 to define the orientation. Referring to the inset view of FIG. 13, multiple orientations of lens 68 (with respect to light engine board 60) are shown which apply to different optic types.

If the SSL light engine 54 is an LED light engine, the one piece cartridge system would include a light engine board 60, one or more LED lamps 62, optics or lenses 68, gasket 70 and bezel 74, which may be a stainless steel bezel. The cartridge system is held together with internal brass stand-offs soldered to the light engine board 60 so that it can be field replaced as a one piece optical system. A die cut foam silicone gasket 70 ensures a weather-proof seal around each individual LED. The cartridge assembly is available in various lighting distributions using optics, such as TIR designed acrylic optical lenses, over each LED lamp.

FIG. 13 illustrates exemplary components of an SSL light engine 54 of an SSL assembly 50, according to the present disclosure. The following components are shown:

Screw 1301—for retention of bezel to PCB (does not secure PCB to housing, but retains bezel to PCB as an assembly prior to installation);
Washer 1302—for compression of foam bushing #1303;
Foam bushing 1303—is compressed to apply pressure to bezel for retention of optics within their alignment holes;
Main gasket 1304—seals around optics;
Perimeter gasket 1305—seals between bezel & housing, in conjunction with main gasket;
SSL light engine board 1306—contains LED lamps and supporting circuitry;
Optics 1307—refract light to create desired distribution on illuminated surface;
Bezel 1308—retains optics and encloses SSL light engine;
Sealing screw 1309—provides access to rotary DIP switch for dimming adjustment, seals aperture when in position.

In another embodiment of the SSL light engine 54, seen in FIGS. 15-18, the SSL light engine 54 may include a light engine board 60 having one or more SSL light elements 62, and a diffusing lens 56 configured to fit within the recess 52a of the external housing 52. The diffusing lens 56 can be configured to provide light diffusing qualities such that an interior surface of the diffusing lens 56 can be covered with spherical projections to diffuse light emitted by the SSL light elements 62. Preferably, the diffusing lens 56 is made out of a diffusing grade of acrylic. The diffusing lens 56 may have a gasket around its perimeter, and is secured to standoffs on the light engine board 60 (e.g., the PCB) in such a way as to prevent excessive stress on the diffusing lens 56.

As noted above, the external housing 52 is made of a material that can provide direct heat exchange between the SSL light engine 54 positioned within the external housing 52 and cooler ambient air. A cast aluminum external housing 52 provides such a direct-heat exchange between the SSL light engine 54 and cooler ambient air. More specifically, the SSL light engine 54 is positioned within recess 52a in external housing 52 such that the surface area of the recess 52a absorbs heat generated by the SSL light engine 54. The heat absorbed by the recess 52a in the external housing 52 is then transferred to the outer surface 52b of the external surface 52 so that cooler ambient air can dissipate the heat. In addition, the dimensions of the external housing 52 are such that the SSL light engine 54 is positioned outside the recess, and in instances when there is a space between the SSL assembly 50 and the housing 20 any air flow through such space can dissipate heat on the inner surface 52c and screw bosses 57 of the external housing 52. The distance between the SSL assembly 50 and the housing 20 is adjustable (e.g., between 0" and 2") to provide the space for air flow.

A thermal regulation circuit can be provided to protect the SSL fixture from excessive temperature by interfacing with the SSL fixture's 0-10V dimmable drivers to reduce drive current as necessary to reduce temperature. The thermal regulation circuit activates at a specific, e.g., a factory-preset temperature, and progressively reduces power over a finite temperature range in recognition of the effect of reduced current on the internal temperature and longevity of the LEDs and other components. The thermal regulation circuit can directly measure the temperature as close to the LED solder point as possible. The thermal regulation circuit can consist of surface mounted components mounted on the light engine board 60 (e.g., printed circuit board). The thermal regulation circuit is preferably designed to "fail on", allowing the SSL fixture to revert to full power in the event of an interruption of its power supply, or faulty wiring connection to the drivers.

An on-board surge protector having a surge current rating of, for example, 20,000 amps using the industry standard 8/20 pSec wave may be provided with the SSL fixture. The surge protector can have a clamping voltage of, for example, 825V, and a surge rating of, for example 540 J.

The foregoing specification provides a description with reference to specific exemplary embodiments. The specification and drawings are to be regarded in an illustrative sense rather than a restrictive sense. Various modifications may be made thereto without departing from the spirit and scope as set forth in the following claims.

What is claimed is:

1. An SSL fixture comprising:
a driver housing configured to be installed in a recess;
an SSL assembly capable of being secured to the driver housing outside of the recess, the SSL assembly including an external housing and an SSL light engine, the external housing being at least partially made of a heat dissipating material capable transferring heat generated by the SSL assembly to ambient air, and the SSL light engine having one or more SSL light elements mounted to a light engine board, the SSL assembly being spaced apart by an adjustable distance from the driver housing allowing for air flow therebetween and across the SSL assembly to dissipate heat;
dimmable drivers within said driver housing;
a thermal regulation circuit electrically coupled to the dimmable drivers and directly measuring a temperature on a surface of the light engine board, the thermal regulation circuit causing the dimmable drivers to reduce wattage used by the SSL light engine in response to a detected increase in the temperature above a predefined threshold temperature; and
a plurality of mounting arms extending outward from exterior sides of the driver housing, wherein the driver housing is secured to the SSL assembly with at least two threaded components, each of the at least two threaded components engaged with one of the plurality of mounting arms, wherein the adjustable distance is adjustable by the at least two threaded components.

2. The SSL fixture of claim 1, wherein the temperature is measured at or adjacent to one of the SSL light elements.

3. The SSL fixture of claim 1, wherein the thermal regulation circuit is a fail on circuit such that the SSL fixture reverts to a full wattage if the thermal regulation circuit fails.

4. The SSL fixture of claim 1, wherein the SSL light engine is secured within a central recess of the external housing.

5. The SSL fixture of claim 1, wherein the SSL assembly further comprises a cover positioned over the SSL light engine and secured to the external housing.

6. The SSL fixture of claim 1, wherein the heat dissipating material comprises cast aluminum.

7. The SSL fixture of claim 1, wherein the driver housing comprises:
   a driver compartment including dimmable drivers; and
   a junction box, the junction box being partitioned into a first compartment for alternating current (AC) wiring and a second compartment for low voltage wiring electrically coupled to the dimmable drivers.

8. The SSL fixture of claim 1, further comprising:
   a diffusing lens secured on a distal side of the light engine with regard to driver housing.

9. An SSL assembly comprising:
   a driver housing configured to be installed in a recess;
   an external housing;
   an SSL light engine secured within the external housing and having one or more SSL light elements mounted to a light engine board;
   dimmable drivers within said driver housing; and
   a thermal regulation circuit electrically coupled to the dimmable drivers and directly measuring a temperature on a surface of the light engine board, the thermal regulation circuit causing the dimmable drivers to reduce wattage used by an SSL light engine in response to a detected increase in the temperature above a predefined threshold temperature;
   at least two threaded components securing the SSL assembly to the driver housing, the SSL assembly being spaced apart by a distance from the driver housing allowing for air flow therebetween and across the SSL assembly to dissipate heat, the distance being adjustable by said at least two threaded components;
   wherein the external housing is made of a heat dissipating material capable transferring heat generated by the SSL light engine to ambient air.

10. The SSL assembly of claim 9, wherein the temperature is measured at or adjacent to one of the SSL light elements.

11. The SSL assembly of claim 9, further comprising:
    a cover positioned over the SSL light engine and secured to the external housing.

12. The SSL assembly of claim 9, wherein the heat dissipating material comprises cast aluminum.

13. The SSL assembly of claim 9, further comprising:
    a diffusing lens positioned on a distal side of the SSL light engine with regard to the driver housing.

14. The SSL assembly of claim 9, wherein the SSL light engine is adaptable to operate at a plurality of different wattages.

15. An SSL fixture comprising:
    a driver housing configured to be installed in a recess of a ceiling;
    an SSL assembly having an SSL light engine with one or more SSL light elements, the SSL assembly securable to the driver housing, outside of the recess and the driver housing, the SSL assembly spaced apart by an adjustable distance from the driver housing allowing for air flow therebetween and across the SSL assembly to dissipate heat;
    dimmable drivers in the driver housing, separated from the SSL assembly, and electrically coupled to the SSL light elements;
    a thermal regulation circuit electrically coupled to the dimmable drivers, the thermal regulation circuit causing the dimmable drivers to reduce wattage used by the SSL light engine in response to a detected increase in temperature of the SSL light engine above at least one predefined threshold temperature;
    a plurality of mounting arms extending outward from exterior sides of the driver housing, wherein the driver housing is secured to the SSL assembly with at least two threaded components, each of the at least two threaded components engaged with one of the plurality of mounting arms, wherein the adjustable distance is adjustable by the at least two threaded components.

16. The SSL fixture of claim 15, wherein the thermal regulation circuit directly measures the temperature on a surface of a light engine board of the SSL assembly.

17. The SSL fixture of claim 16, wherein the temperature is measured at or adjacent to one of the SSL light elements.

18. The SSL fixture of claim 16, wherein the thermal regulation circuit causes the dimmable drivers to reduce wattage used by an SSL light engine in an inversely proportional response to a detected increase in temperature of the SSL light engine above a predefined threshold temperature.

\* \* \* \* \*